(12) United States Patent
Mavrosakis (10) Patent No.: US 7,214,037 B2
(45) Date of Patent: May 8, 2007

(54) RETENTION OF BALL BEARING CARTRIDGE FOR TURBOMACHINERY

(75) Inventor: Peter Mavrosakis, Lomita, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/879,253

(22) Filed: Jun. 28, 2004

(65) Prior Publication Data

US 2005/0287018 A1    Dec. 29, 2005

(51) Int. Cl.
*F04B 17/00*   (2006.01)
*F16C 19/00*   (2006.01)
*F16C 27/00*   (2006.01)

(52) U.S. Cl. .................... 417/407; 417/406; 384/474; 384/475; 384/99

(58) Field of Classification Search ........ 417/406–407; 384/474–475, 906, 99
See application file for complete search history.

(56) References Cited

U.S. PATENT DOCUMENTS

| | | | | |
|---|---|---|---|---|
| 2,194,328 A | * | 3/1940 | Shafer | 384/475 |
| 2,441,294 A | * | 5/1948 | Shafer | 384/475 |
| 2,451,115 A | * | 10/1948 | Pew | 384/475 |
| 2,690,683 A | * | 10/1954 | Schottler | 74/424.75 |
| 3,195,965 A | * | 7/1965 | Van Dorn | 384/475 |
| 3,304,802 A | | 2/1967 | Kofink | |
| 3,311,429 A | * | 3/1967 | Kocian | 384/475 |
| 4,652,219 A | | 3/1987 | McEachern, Jr. et al. | 417/407 |
| 4,671,681 A | * | 6/1987 | LaRou | 384/475 |
| 4,713,146 A | | 12/1987 | Ek | |
| 4,721,441 A | | 1/1988 | Miyashita et al. | 417/407 |
| 4,887,479 A | * | 12/1989 | Griffey | 74/424.9 |
| 4,943,170 A | | 7/1990 | Aida | 417/407 |
| 4,983,050 A | | 1/1991 | Aida | 384/906 |
| 4,997,290 A | | 3/1991 | Aida | 384/474 |
| 5,028,150 A | | 7/1991 | Kronenberger et al. | 384/476 |
| 5,890,881 A | * | 4/1999 | Adeff | 417/407 |
| 6,220,829 B1 | * | 4/2001 | Thompson et al. | 417/407 |
| 6,290,397 B1 | * | 9/2001 | Hashimoto | 384/462 |

FOREIGN PATENT DOCUMENTS

| | | |
|---|---|---|
| EP | 0 504 138 B1 | 9/1994 |
| GB | 2107002 | 4/1983 |
| JP | 49078048 | 7/1974 |
| WO | WO 01/69046 | 9/2001 |

* cited by examiner

*Primary Examiner*—Thai-Ba Trieu
(74) *Attorney, Agent, or Firm*—Chris James; Byian Pangile

(57) ABSTRACT

An exemplary housing for a turbocharger includes a substantially cylindrical bore having a longitudinal axis, an inner diameter, a proximate end and a distal end; a counterbore positioned at the distal end, substantially centered on the longitudinal axis and having an inner diameter; a plate attachment mechanism at the proximate end for attachment of a plate including an opening substantially centered on the longitudinal axis and having an inner diameter wherein the inner diameter of the cylindrical bore exceeds the inner diameter of the counterbore and the inner diameter of the opening of the plate; and a pin opening to the cylindrical bore positioned substantially at the inner diameter of the bore, the pin opening capable of receiving a pin. Various exemplary bearing cartridges, housings, assemblies, etc., are also disclosed.

11 Claims, 8 Drawing Sheets

RETENTION OF BALL BEARING CARTRIDGE FOR TURBOMACHINERY

TECHNICAL FIELD

Subject matter disclosed herein relates generally to turbomachinery for internal combustion engines and, in particular, rolling element bearing cartridges and bearing housings for such bearing cartridges.

BACKGROUND

The advantages associated with low friction bearings are well known to a multitude of varied industries. High-speed applications with DN (dynamic number) values over 1,000,000 are common place for turbomachinery. These high-speed applications, owing to the fact that rotor imbalance force increases as a square function of rotor speed, require damping. Without damping, transmitted forces through the system would cause many well-known problems such as noise, fretting, loosening of joints, and overall reduced service life. Further, the bearings themselves would have unacceptable life. For these reasons, turbomachinery bearings are not hard mounted within their housings. The skilled rotordynamics design engineer spends the majority of his/her life managing these forces, especially those forces encountered as the rotor goes through its natural frequencies, commonly referred to as "critical speeds".

Most turbochargers that employ a low friction rolling element bearing use two angular contact ball bearings, with each accepting the thrust load in a given axial direction, that are joined together in what is commonly referred to as a "cartridge". In a cylindrical coordinate system a bearing may be defined with respect to axial, radial and azimuthal dimensions. Within a bearing housing, referred to as housing in subsequent text, a cartridge is located axially and azimuthally via one or more mechanisms. For proper functioning, some movement can occur in a radial direction along a radial line typically defined by an azimuthal locating mechanism.

Conventional bearing cartridge and housing assemblies typically rely on an axial thrust load pin to locate the cartridge axially and azimuthally within a housing. Such pins have a limited ability to align the cartridge in a housing and receive most of the thrust load. Consequently, axial thrust load pins can raise serious wear and misalignment issues.

Overall, an industry need exists for rolling element bearings and/or housings that allow for better alignment and/or reduced wear. Various exemplary bearing cartridges and housings presented herein address such issues and optionally other issues.

BRIEF DESCRIPTION OF THE DRAWINGS

A more complete understanding of the various methods, devices, systems, arrangements, etc., described herein, and equivalents thereof, may be had by reference to the following detailed description when taken in conjunction with the accompanying drawings wherein.

DETAILED DESCRIPTION

Various exemplary methods, devices, systems, arrangements, etc., disclosed herein address issues related to technology associated with turbochargers and are optionally suitable for use with electrically assisted turbochargers.

Figure 1A:
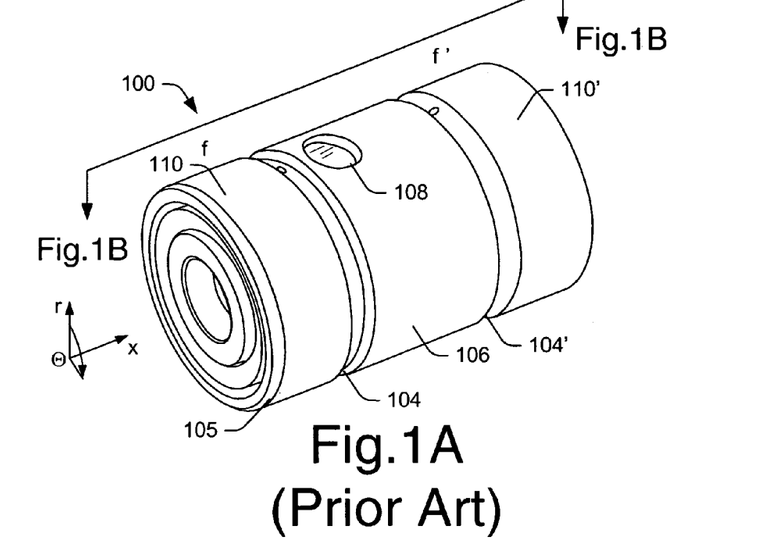
FIG. 1A is a perspective view diagram of a prior art bearing cartridge for a turbocharger.

FIG. 1A shows a perspective view of prior art bearing cartridge 100. A cylindrical coordinate system is shown for reference that includes radial (r), axial (x) and azimuthal (Θ) dimensions. The cartridge 100 includes two annular wells 104, 104' positioned on an outer race 105 intermediate a center section 106 and respective ends of the cartridge 100. The center section 106 of the cartridge 100 includes an opening 108 that cooperates with a pin to position the cartridge 100 axially and azimuthally in a housing or journal. For example, conventional bearing cartridges for turbomachinery often rely on an axial thrust load pin that is received by such an opening to axially locate the bearing cartridge in a conventional housing.

The wells 104, 104' are positioned adjacent to outer sections 110, 110' of the outer race 105, respectively. The outer sections 110, 110' have equal outer diameters that define a clearance with a housing and thereby allow for formation of lubricant films f, f'.

Figure 1B:
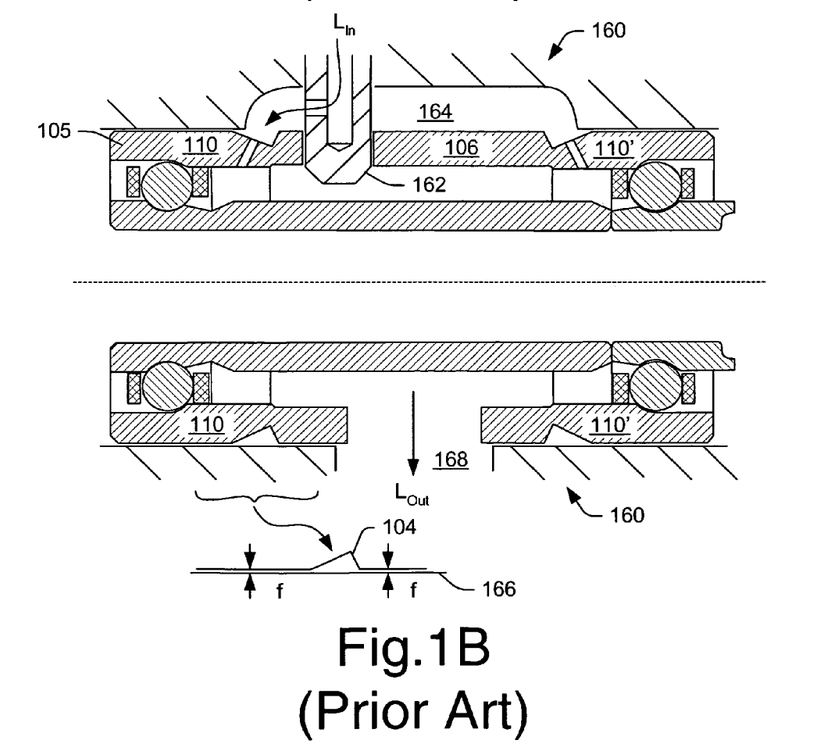
FIG. 1B is a diagram of a prior art bearing cartridge in a prior art housing.

FIG. 1B shows a cross-sectional view of the prior art cartridge 100 in a prior art housing 160. A pin 162 acts to locate the cartridge 100 axially and azimuthally while allowing freedom in the radial direction. In particular, the pin 162 cooperates with the outer race 105. Axial thrust load along the x-axis causes force to be transmitted from the outer race 105 of the bearing cartridge 100 to the housing 160 via the pin 162. As the pin allows for radial movement, some small amount of clearance exists between the outer diameter of the pin 162 and the inner diameter of the opening 108. Consequently, during operation thrust may cause axial movement of the cartridge with respect to the housing. Such movement can contribute to wear and misalignment.

The pin 162 also allows for lubricant to flow via a conduit in the pin 162 to a lubricant entrance well 164 adjacent the center section 106 of the cartridge 100. A lubricant exit well 168 exists nearly opposite the entrance well 164 that allows for drainage of lubricant in and about the cartridge 100.

As shown in FIG. 1B, a clearance exists between an outer diameter of the outer sections 110, 110' and an inner diameter of the housing 160. In this prior art assembly, the clearance defines a single film thickness f. An enlargement of the cross-section shows the single film thickness f as it exists on either side of the well 104. The selection of this clearance (squeeze film thickness) acts to determine the operational characteristics such as rotor radial freedom and damping of rotor imbalance forces.

Figure 2:
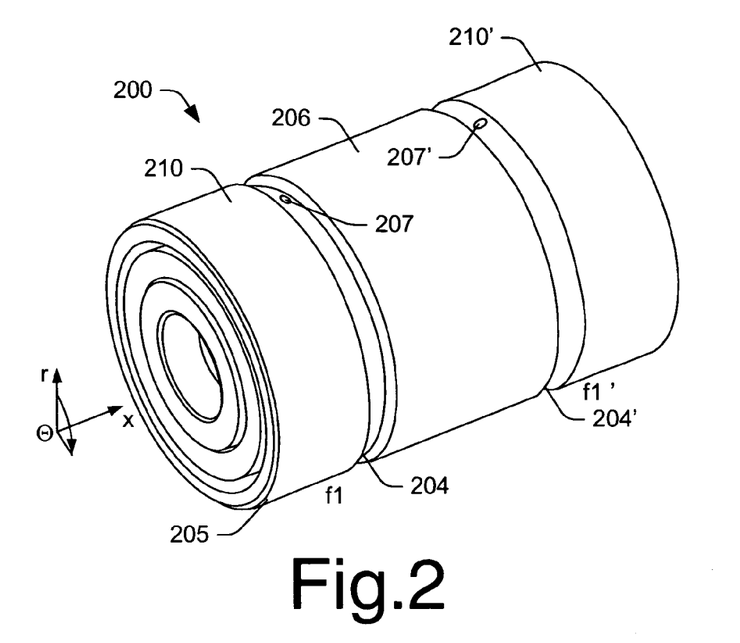
FIG. 2 is a perspective view diagram of an exemplary bearing cartridge that does not include an aperture to receive an axial thrust load pin.

FIG. 2 shows a perspective view on an exemplary bearing cartridge 200 that does not include an opening for receiving an axial thrust load pin. The cartridge 200 includes two annular wells 204, 204' positioned on an outer race 205 intermediate a center section 206 and respective ends of the cartridge 200. In this example, the cartridge 200 includes openings 207 and 207' that allow jet lubrication to enter and be directed at the balls of the cartridge 200. Additional openings are optionally included for lubricant flow.

The wells 204, 204' are positioned adjacent to end sections 210, 210', respectively. The end sections 210, 210' of the outer race 205 have outer diameters that can define clearances with a housing and thereby allow for formation of lubricant films f1, f1', which may be substantially equal.

Figure 3:
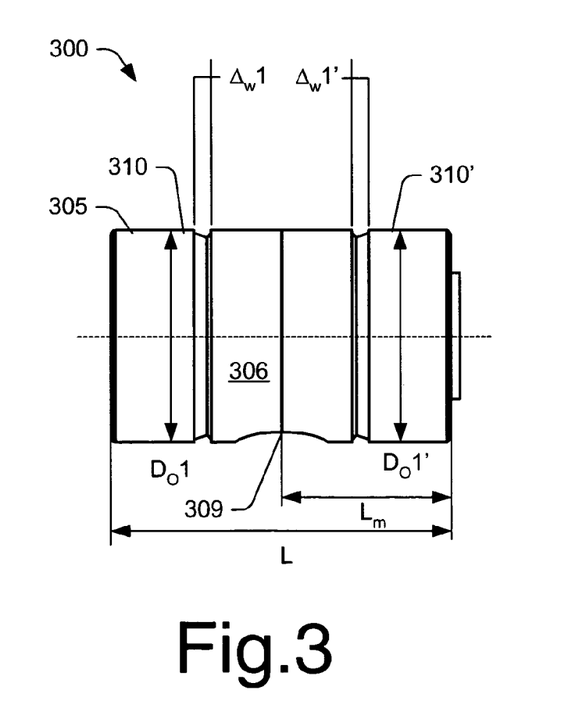
FIG. 3 is a side view of an exemplary bearing cartridge that does not include an aperture to receive an axial thrust load pin.

FIG. 3 shows a side view of an exemplary cartridge 300 such as the cartridge 200 of FIG. 2. The cartridge 300 includes an outer race 305 having an approximate length L, an approximate axial midpoint $L_m$ and including end sections 310, 310' having outer diameters $D_O1$, $D_O1'$. In this example, a drain or lubricant opening 309 is positioned at an axial position at or proximate to the midpoint $L_m$. The cartridge 300 may include openings such as 207, 207' of the cartridge 200 of FIG. 2. The lubricant opening 309 optionally receives a pin or other device to limit rotation of the outer race 305. The lubricant opening 309 may receive such a rotation limiting device while still being capable of some radial movement.

The cartridge 300 includes wells of axial width $\Delta_w 1$, $\Delta_w 1'$ exist between a center section 306 and end sections 310, 310' with outer diameters $D_O1$ and $D_O1'$. The well widths $\Delta_w 1$, $\Delta_w 1'$ may be substantially equal. The outer sections 310, 310' may differ in axial width. For example, the cartridge 300 may include an outer section 310 with outer diameter $D_O1$ that has an axial width less than the outer section 310' with outer diameter $D_O1'$.

The exemplary cartridge 300 includes various parameters that may be used to achieve desired performance characteristics. For example, the axial width and outer diameters of the various sections may be used to define radial clearances/film thicknesses and axial film length(s). In general, judicious selection of thickness, length and number of squeeze films can act to achieve suitable reduction in radial freedom and optimized damping of rotor imbalance forces. Various examples capable of multiple squeeze film thicknesses are described further below with respect to FIG. 8 and FIGS. 9A–B.

Figure 4:
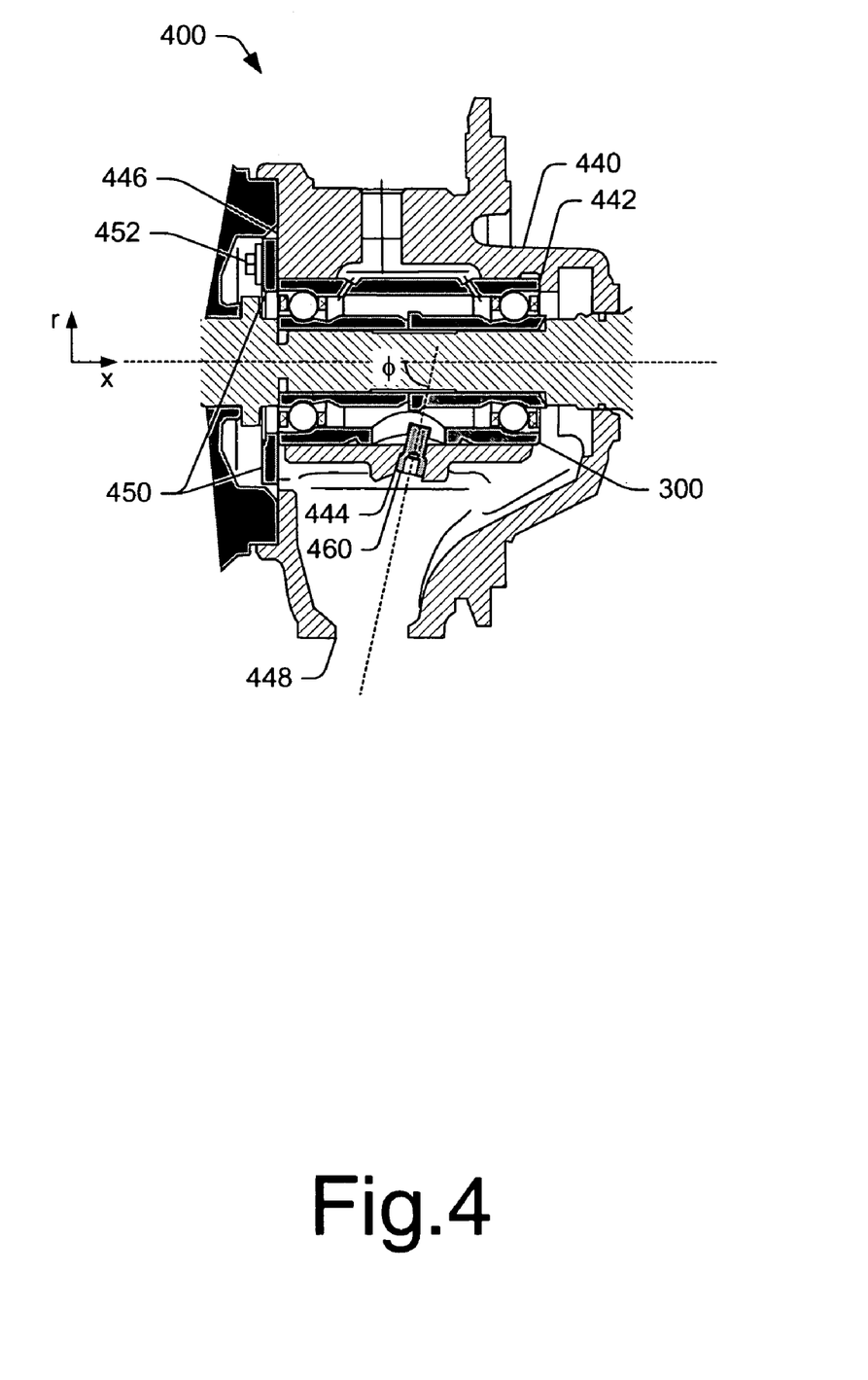
FIG. 4 is a cross-sectional view of an exemplary assembly that includes an exemplary housing and an exemplary bearing cartridge.

FIG. 4 shows a cross-sectional diagram of an exemplary assembly 400 of a turbomachinery device. The assembly 400 includes a bearing cartridge 300 positioned in a housing 440 and located axially with aid of a plate 450. In this example, the plate 450 abuts a surface 446 of the housing 440. A pin 460 received by an opening 444 of the housing 440 optionally aids in locating the cartridge 300 azimuthally with respect to the housing 440. The opening 444 optionally comprises a pin opening having an axis that intersects the central axis (e.g., x-axis) at an angle ϕ, which is optionally non-orthogonal.

In this example, the cartridge 300 is located axially with aid of a counterbore 442 of the housing 440 and the plate 450. In general, the plate 450 and the counterbore 442 define an axial distance that is greater than the axial length of the outer race of the bearing cartridge 300. Proper operation of the assembly 400 requires some amount of radial movement; consequently, the axially locating mechanism allows the bearing cartridge to move radially. Further, a clearance may be defined by the difference between the axial distance between a surface of the plate 450 and a surface of the counterbore 442 and the axial length of the outer race of the bearing cartridge 300. Adjustment to such a clearance may be possible via a fixation mechanism of the plate 450 (see, e.g., bolt 452) and/or other features (e.g., gaskets, spacers, etc.).

Various features of the exemplary assembly 400 also act to directly distribute axial thrust loads to more than one component. For example, the plate 450 can receive thrust loads and the counterbore 442 of the housing 440 can receive axial thrust loads from the bearing cartridge 300. In comparison, the conventional assembly of FIG. 1B transmits axial thrust loads directly and solely to the pin 162. In addition, the exemplary assembly 400 can distribute axial thrust loads over greater surface area when compared to the pin 162 of the conventional assembly of FIG. 1B.

As already mentioned, the housing 440 includes an opening 444 that can receive the pin 460 to aid in azimuthal location of the outer race of the bearing cartridge 300. Such a pin may be referred to as an anti-rotation pin or an azimuthal locating pin because it acts to locate azimuthally and limit rotation of an outer race of a bearing cartridge with respect to a housing. In this example, a lubricant drain opening 448 of the housing 440 allows for insertion of the pin 460 in the opening 444. In this manner, the lubricant drain opening 448 allows drainage of lubricant and insertion and/or adjustment of an anti-rotation pin. While a straight line shows access to the opening 444, access is optionally indirect (e.g., not along a straight line).

Figure 5:
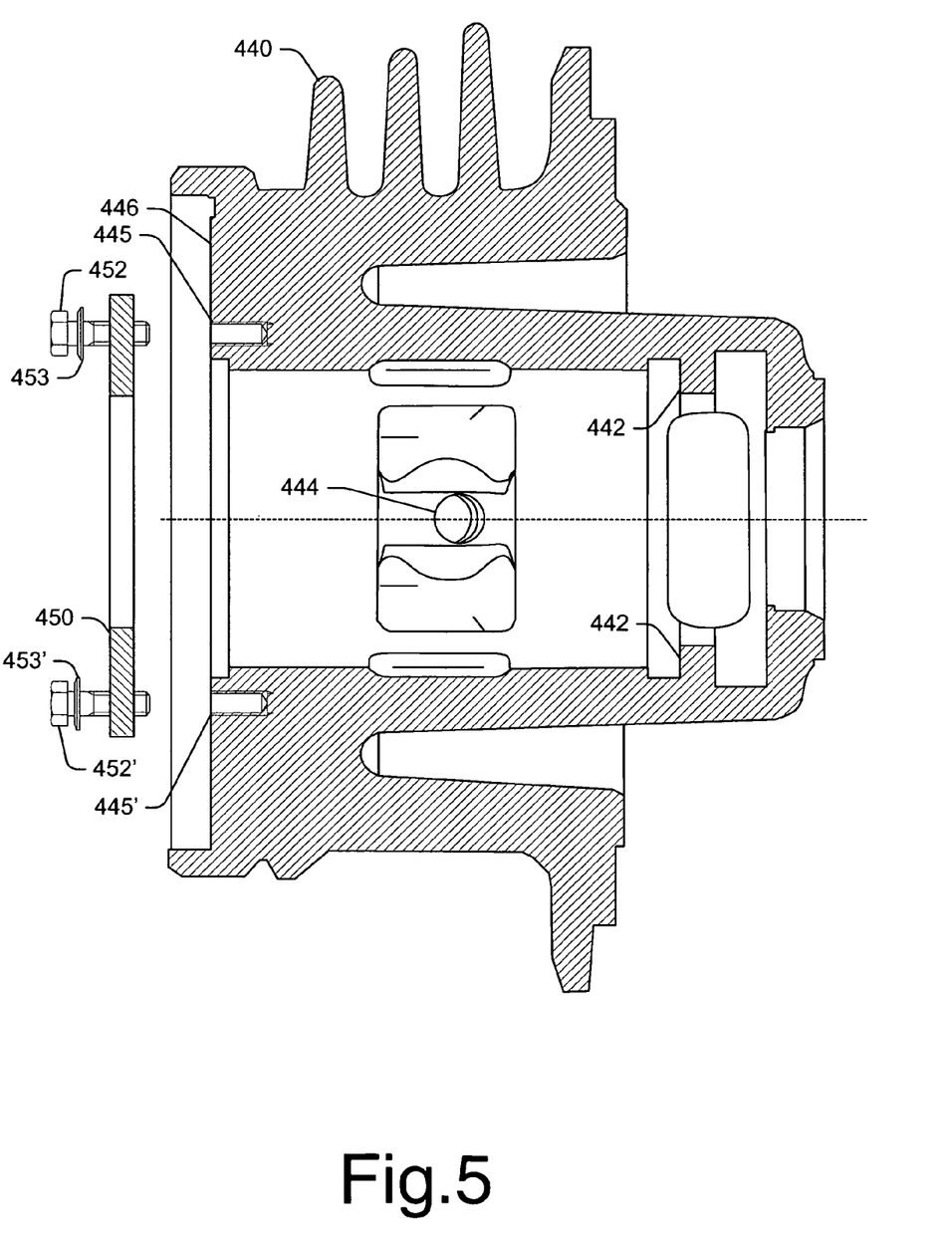
FIG. 5 is a cross-sectional view of an exemplary housing that includes features for axially locating a bearing cartridge.

FIG. 5 shows a cross-sectional top view of an exemplary housing 440 and a plate 450. The exemplary housing 440 includes a proximate recessed surface 446 and a distal counterbore 442. The proximate recessed surface 446 is optionally associated with a compressor side of a turbomachinery device and the distal counterbore 442 is optionally associated with a turbine side of a turbomachinery device. Of course, other arrangements are possible.

The exemplary housing 440 includes an opening 444 set an angle to a central longitudinal housing axis (e.g., x-axis) that allows for insertion of a pin. Such a pin may act to azimuthally locate an outer race of a bearing cartridge in the exemplary housing 440.

The exemplary housing 440 includes an attachment mechanism for the plate 450. In this example, threaded holes 445, 445' are providing that open along the surface 446. The holes 445, 445' receive bolts 452, 452', respectively. Washers 453, 453' are also shown in this example. Other attachment mechanisms may be used for attaching a plate or limiting mechanism to a housing. Further, while a substantially circular shaped plate is shown, other shapes or limiting mechanisms are possible and may include one or more surfaces and/or one or more components that act to limit movement of an outer race of a bearing cartridge in the cylindrical bore of a housing in conjunction with a counterbore. An exemplary housing optionally includes an attachment mechanism or mechanisms for one or more limiting components that extend radially inward to a minimum radius less than the inner radius of a cylindrical bore wherein at least some of the components can act to limit axial movement of a bearing cartridge in the cylindrical bore.

Figure 6:
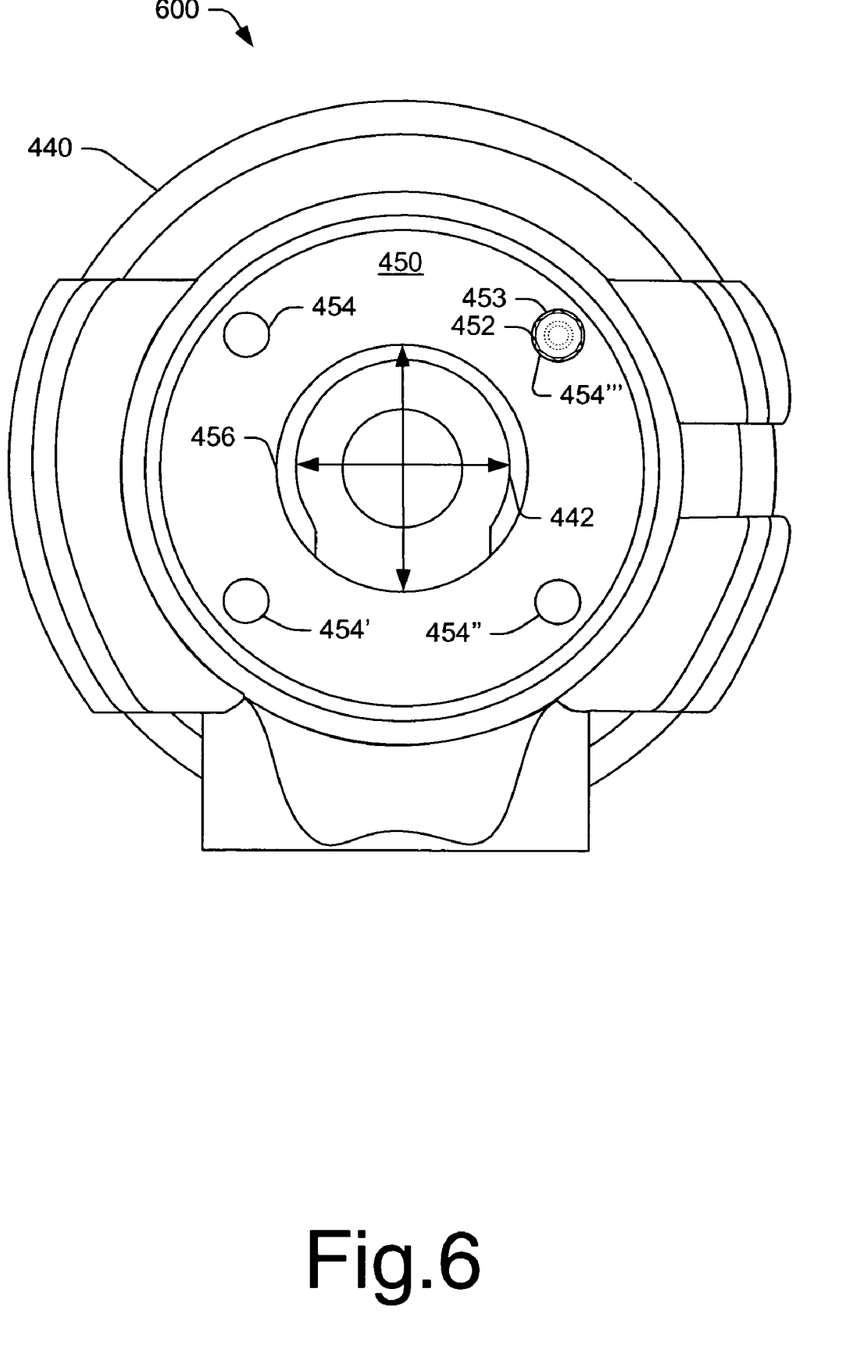
FIG. 6 is front view of an exemplary housing assembly that includes a retaining mechanism that acts to axially locate a bearing cartridge in the housing assembly.

FIG. 6 shows a front view of an exemplary assembly 600 that includes an exemplary housing 440 and an exemplary plate 450. In this example, the plate 450 fits in a recess of the housing 440. The plate 450 acts to define an axial distance along with a counterbore of the housing (not shown in FIG. 6, see, e.g., FIG. 5). In conjunction with an axial length of an outer race of a bearing cartridge, the axial distance acts to define a clearance or clearances between the outer race and the plate 450 and/or the counterbore of the housing 440. The exemplary plate 450 includes four openings 454, 454', 454", 454''' for use in securing the plate 450 to the housing 440. A bolt 452 or other device passes through the opening 454''' to secure the plate 450 to the housing 440. In this example, a washer 453 cooperates with the bolt 452 to secure the plate 450.

The plate 450 includes an opening 456 that has an inner diameter less than the inner diameter of a substantially cylindrical bore of the housing 440. In this example, the opening 456 is substantially coaxial with the cylindrical bore of the housing 440. A counterbore 442 of the housing 440 has an inner diameter less than the inner diameter of the cylindrical bore of the housing 440. In this example, the counterbore 442 has an arc length less than 360 degrees. Exemplary counterbores may include one or more arc segments, protrusions, etc., that extend inwardly toward a longitudinal or center axis of the cylindrical bore to thereby limit movement of an outer race of a bearing cartridge in the cylindrical bore.

Figure 7:
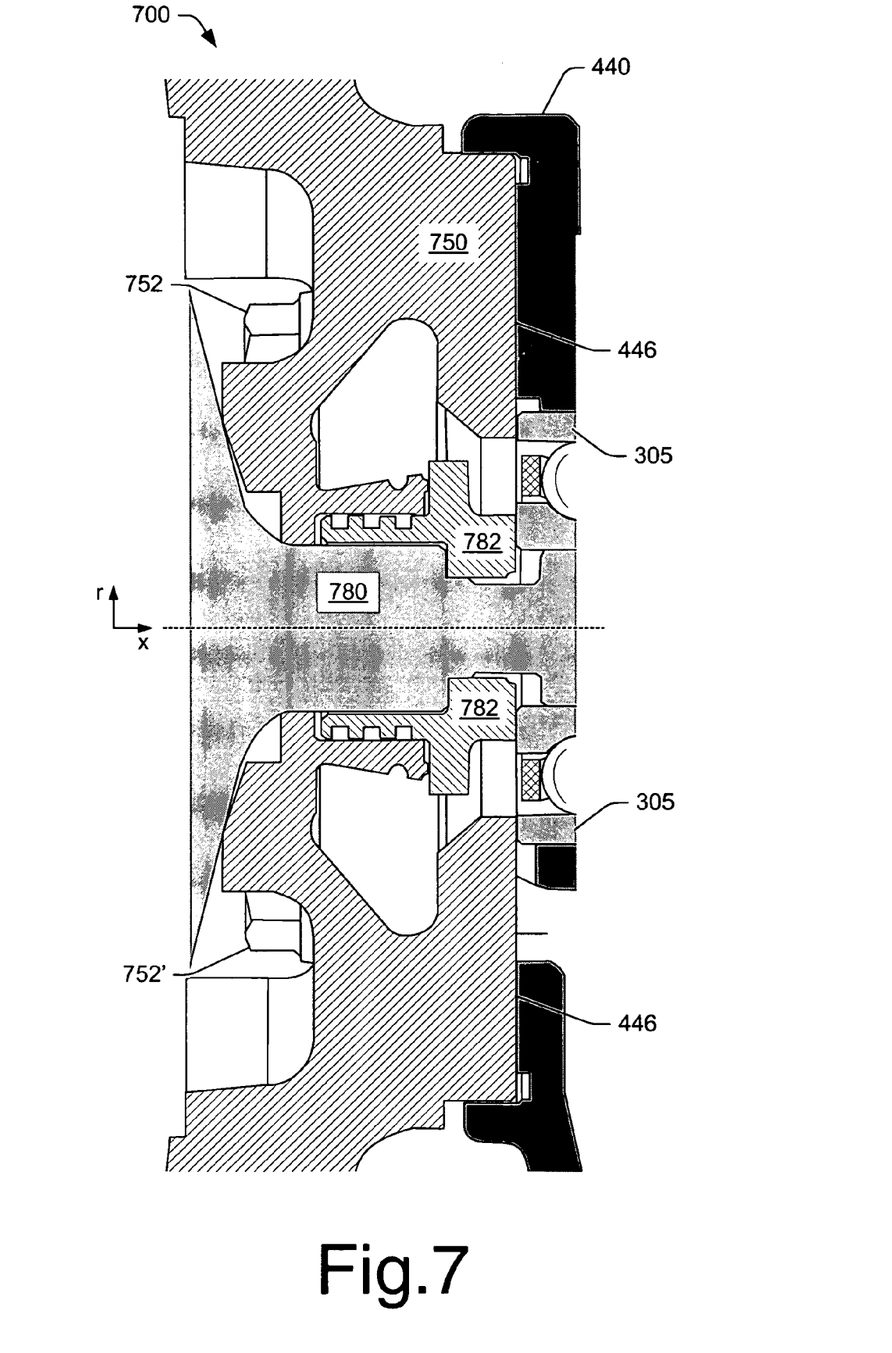
FIG. 7 is a cross-sectional side view of an exemplary retaining mechanism that acts to axially locate a bearing cartridge in a housing.

FIG. 7 shows an exemplary assembly 700 that includes an exemplary plate 750. In this example, the plate 750 is a compressor backplate (see. e.g., compressor wheel 780 and associated collar 782) that fits into the recessed region of a housing 440, for example, at a surface 446. In this example, an attachment mechanism includes use of blots 752, 752' to secure the plate 750 to the housing 440. The plate 750 extends radially inward past the surface 446 where it further extends past at least a portion of an outer race 305 of a bearing cartridge. The plate 750 includes an opening that has an inner dimension (e.g., a diameter, etc.) that is less than the outer diameter of the outer race 305. While an exemplary plate may include a substantially circular opening with a diameter less than that of an outer race of a bearing cartridge, various exemplary plates may include other shapes, protrusions, etc., that extend inwardly past an inner diameter of a substantially cylindrical bore of a housing to thereby limit axial movement of an outer race of a bearing cartridge. For example, an exemplary plate optionally includes one or more protrusions that extend radially inward toward a central axis to limit movement of an outer race of a bearing cartridge. While not shown in FIG. 7, the housing 440 optionally includes a counterbore to limit movement of the outer race 305, for example, where the plate 750 is positioned at a proximate end of a substantially cylindrical bore of a housing and the counterbore is positioned at distal end of the substantially cylindrical bore of the housing (see, e.g., the counterbore 442 of FIG. 5). Further, the housing 440 of FIG. 7 optionally includes an opening such as the opening 444 of FIG. 5 (e.g., a pin opening, etc.). While such an opening is sometimes referred to herein as a "pin" opening, the term pin may optionally refer to various mechanisms such as screws, bolts, etc., that act to limit rotation of an outer race of a bearing cartridge.

Figure 8:
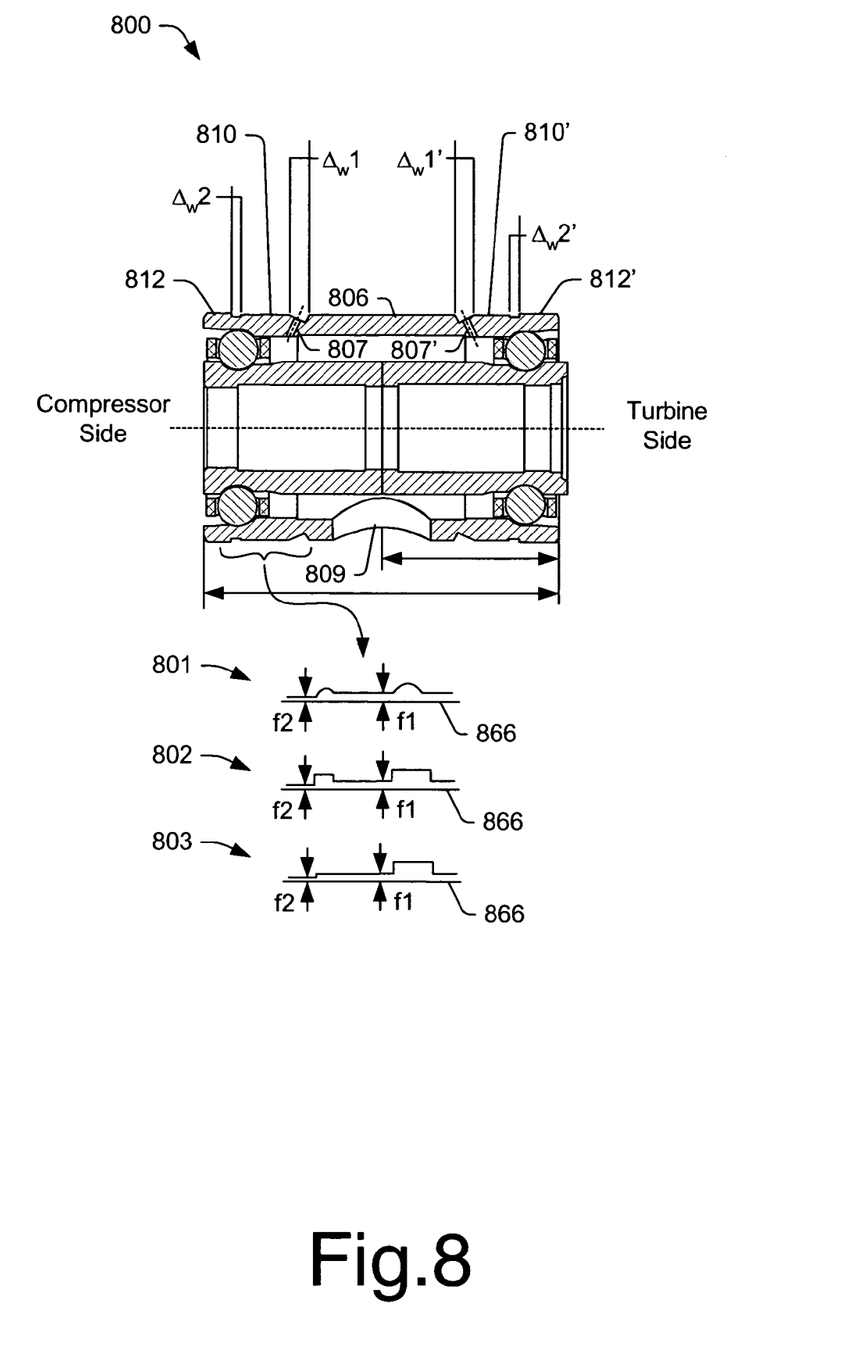
FIG. 8 is a cross-sectional side view of an exemplary bearing cartridge that includes various outer surface regions.

FIG. 8 shows a cross-sectional diagram of an exemplary bearing cartridge 800 that allows for multiple films of optionally different thicknesses. The cartridge 800 includes a center section 806, intermediate sections 810, 810' and outer sections 812, 812'. The bearing also includes lubricant passages 807, 807' and 809.

An enlargement shows various wells (e.g., wells, grind reliefs, etc.) and/or transitions from a first outer diameter to a second outer diameter. A wall 866 of a housing or journal having an inner diameter acts to define clearances and film thicknesses f1, f2. In a first scenario 801, wells have curvilinear cross-section; in a second scenario 802, wells have substantially polygonal cross-section; and in a third scenario 803, a step in outer diameter exists between a thick film region f1 and a thinner film region f2. The scenarios 801, 802, 803 are exemplary as others may be used to create clearances that form multiple film thicknesses.

A housing or journal may act to define clearances that form multiple film thicknesses between the housing and one or more outer diameters of a bearing cartridge. For example, an exemplary housing may include two or more inner diameters that act to define more than one annular clearance with a bearing cartridge and a counterbore to help axially locate the bearing cartridge and/or an opening for receiving a pin to help azimuthally locate an outer race of the bearing cartridge.

Figure 9A:
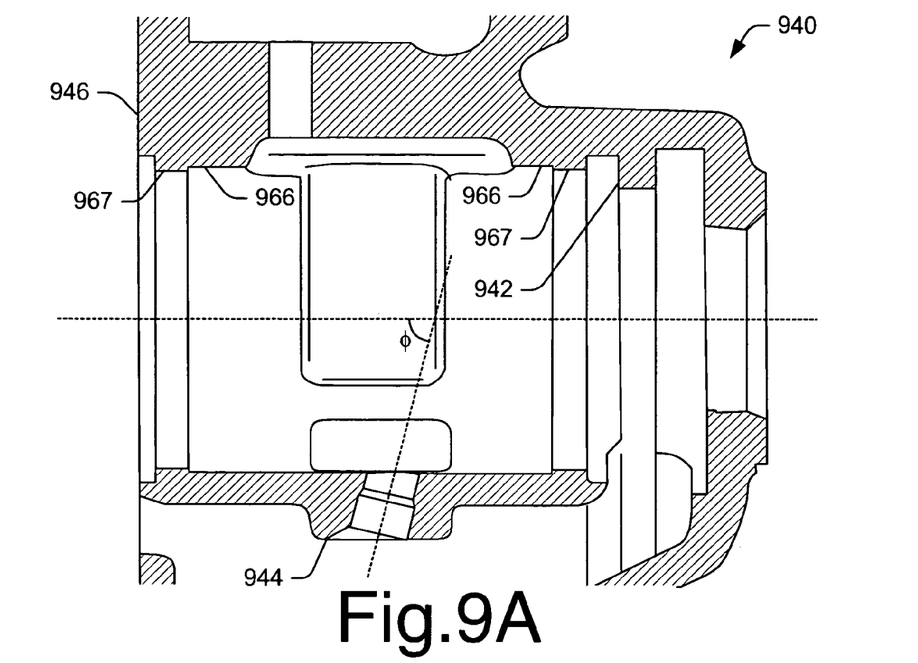
FIG. 9A is a cross-sectional side view of an exemplary housing that includes two regions with different inner diameters to thereby allow for formation of, for example, two film regions in conjunction with a bearing cartridge.
Figure 9B:
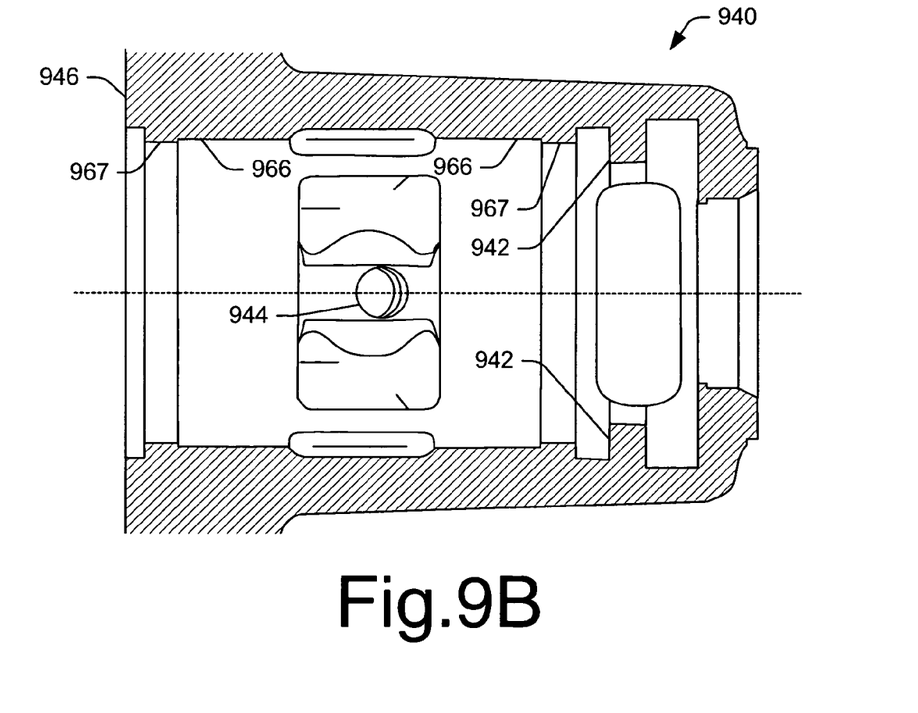
FIG. 9B is a cross-sectional top view of an exemplary housing that includes two regions with different inner diameters to thereby allow for formation of, for example, two film regions in conjunction with a bearing cartridge.

FIG. 9A shows a cross-sectional, side view of an exemplary housing 940 and FIG. 9B shows a cross-sectional top view of the exemplary bearing housing 940. The exemplary housing 940 can house a bearing cartridge and act to define clearances between an outer surface of the bearing cartridge and an inner wall of the housing 940 wherein the clearances act to form various films that can be aimed at reduction of unwanted excessive radial clearance and/or optimized damping of rotor imbalance forces.

The exemplary housing 940 includes a counterbore 942, an opening 944 and a surface 946 substantially perpendicular to a central axis (e.g., x-axis). The opening 944 optionally comprises a pin opening having an axis that intersects the central axis at an angle φ, which is optionally non-orthogonal. The surface 946 and the counterbore 942 may define a distance that in combination with a bearing cartridge acts to define an axial clearance. A plate (see, e.g., the plate 450 of FIG. 6) or other component optionally cooperates with the surface 946 to define a proximate end of a bearing cartridge chamber while the counterbore 942 defines a distal end of the bearing cartridge chamber.

The bearing cartridge chamber includes an inner surface 966 that has a first inner diameter and an inner surface 967 that has a second inner diameter wherein the first inner diameter exceeds the second inner diameter. A bearing cartridge that includes an outer surface having an outer diameter may act to define annular clearances with the first and second inner surfaces 966, 967 when positioned in the housing to form an assembly.

Various exemplary devices, methods, systems, arrangements, etc., described herein pertain to formation and use of multiple film thicknesses. In various examples, one film has damping characteristics and another film has characteristics that minimize excessive radial freedom and play.

An exemplary bearing cartridge includes an inner film to outer film ratio of approximately 1:2, i.e., the inner film being approximately twice the thickness of the outer film. For example, an inner film of approximately 0.0030 inch (approx. 0.076 mm) and an outer film of approximately 0.0015 inch (approx. 0.0038 mm) wherein the inner film acts to dampen vibrations and the outer film acts to limit rotor radial play. Such an exemplary bearing cartridge may be suitable for use in a commercially available GARRETT® GTA47-55R turbomachinery device (Torrance, Calif.).

In general, a sufficiently thick film can act to reduce noise and vibration and loading through the system; whereas a thinner film can reduce slop or play in the system (e.g., rotor play, etc.). A thinner film may also allow for reduction in wheel to housing clearances in a turbocharger system, which can act to reduce undesirable secondary aerodynamic flows that would cause reduced compressor and turbine stage thermodynamic efficiencies.

Various examples include one or more thinner clearance regions proximate to an outer end(s) of a bearing cartridge. A pair of thinner clearance regions proximate to outer ends of a bearing cartridge may limit pivot when compared to a thinner clearance region(s) positioned proximate to or at a center section.

Although some exemplary methods, devices, systems arrangements, etc., have been illustrated in the accompanying Drawings and described in the foregoing Detailed Description, it will be understood that the exemplary embodiments disclosed are not limiting, but are capable of numerous rearrangements, modifications and substitutions without departing from the spirit set forth and defined by the following claims.

What is claimed is:

1. An assembly for a turbocharger comprising:
   a housing comprising a substantially cylindrical bore having a longitudinal axis, an inner diameter, a proximate end and a distal end and a counterbore positioned at the distal end, substantially centered on the longitudinal axis and having an inner diameter;
   a bearing cartridge substantially centered on the longitudinal axis between the proximate end and the distal end and comprising a unitary outer race, the unitary outer race having an outer diameter at a proximate end, an outer diameter at a distal end, an inner diameter at a proximate end and an inner diameter at a distal end, and an inner race; and
   a compressor plate positioned at the proximate end, the plate including an opening substantially centered on the longitudinal axis and having an inner diameter less than the outer diameter at the proximate end of the unitary outer race
   wherein the inner diameter of the counterbore is less than the outer diameter at the distal end of the unitary outer race
   wherein the inner diameter of the cylindrical bore exceeds the outer diameter of the unitary outer race, the inner diameter of the counterbore and the inner diameter of the opening of the plate, and
   wherein the counterbore and the plate limit axial movement of the unitary outer race of the bearing cartridge.

2. A housing for a turbocharger comprising:
   a substantially cylindrical bore having a longitudinal axis, an inner radius, a proximate end and a distal end for receiving a bearing cartridge to rotatably support a shaft, the shaft having an outer radius, the bearing cartridge comprising comprising
      a unitary outer race, the unitary outer race having an outer radius at a proximate end, an outer radius at a distal end, an inner radius at a proximate end and an inner radius at a distal end,
      an inner race, and
      a proximate set of bearings disposed between the unitary outer race and the inner race and a distal set of bearings disposed between the unitary outer race and the inner race
   wherein the cylindrical bore comprises an inner surface at a first radius and an inner surface at a second radius wherein the inner surfaces define film regions in conjunction with the unitary outer race of the bearing cartridge;
   a counterbore positioned at the distal end, substantially centered on the longitudinal axis and having an inner radius wherein the inner radius of the cylindrical bore exceeds the inner radius of the counterbore and wherein the inner radius of the counterbore is approximately equal to or greater than the inner radius at the distal end of the unitary outer race and less than the outer radius at the distal end of the unitary outer race; and
   one or more attachment mechanisms at the proximate end for attachment of one or more limiting components that extend radially inward to a minimum radius less than the inner radius of the cylindrical bore and greater than the unitary outer radius of the shaft.

3. The housing of claim 2 further comprising a pin opening to the cylindrical bore positioned substantially at the inner radius of the bore, the pin opening for receiving a pin.

4. An assembly for a turbocharger comprising:
   a housing comprising a substantially cylindrical bore having a longitudinal axis, an inner diameter, a proximate end and a distal end and a counterbore positioned at the distal end, substantially centered on the longitudinal axis and having an inner diameter;
   a bearing cartridge substantially centered on the longitudinal axis between the proximate end and the distal end and comprising
      a unitary outer race, the unitary outer race having an outer diameter at a proximate end, an outer diameter at a distal end, an inner diameter at a proximate end and an inner diameter at a distal end,
      an inner race, and
      a proximate set of bearings disposed between the unitary outer race and the inner race and a distal set of bearings disposed between the unitary outer race and the inner race; and
   a limiting mechanism positioned at the proximate end,
   wherein the inner diameter of the counterbore is approximately equal to or greater than the inner diameter at the distal end of the unitary outer race and less than the outer diameter at the distal end of the unitary outer race
   wherein the inner diameter of the cylindrical bore exceeds the outer diameter of the outer race and the inner diameter of the counterbore,
   and
   wherein the counterbore and the limiting mechanism limit axial movement of the unitary outer race of the bearing cartridge.

5. The assembly of claim 4 wherein an annular clearance exists between the unitary outer race and the cylindrical bore.

6. The assembly of claim 5 wherein the annular clearance defines a lubricant film thickness.

7. The assembly of claim 4 further comprising a pin opening to the cylindrical bore positioned at the inner diameter of the bore, the pin opening capable of receiving a pin to limit rotation of the outer race of the bearing cartridge about the longitudinal axis.

8. The assembly of claim 4 wherein the unitary outer race of the bearing cartridge comprises an outer surface at a first outer diameter and an outer surface at a second outer diameter wherein the outer surfaces define film regions in conjunction with the inner diameter of the cylindrical bore.

9. The assembly of claim 8 wherein the film regions differ in thickness.

10. The assembly of claim 4 wherein the limiting mechanism comprises a plate.

11. An assembly for a turbocharger comprising:
- a housing comprising a substantially cylindrical bore having a longitudinal axis, an inner diameter, a proximate end and a distal end and a counterbore positioned at the distal end, substantially centered on the longitudinal axis and having an inner diameter;
- a bearing cartridge substantially centered on the longitudinal axis between the proximate end and the distal end and comprising
    - a unitary outer race, the unitary outer race having an outer diameter at a proximate end, an outer diameter at a distal end, an inner diameter at a proximate end and an inner diameter at a distal end,
    - an inner race, and
    - a proximate set of bearings disposed between the unitary outer race and the inner race and a distal set of bearings disposed between the unitary outer race and the inner race; and
- a plate positioned at the proximate end, the plate including an opening substantially centered on the longitudinal axis and having an inner diameter approximately equal to or greater than the inner diameter at the proximate end of the unitary outer race and less than the outer diameter at the proximate end of the unitary outer race wherein the inner diameter of the counterbore is approximately equal to or greater than the inner diameter at the distal end of the unitary outer race and less than the outer diameter at the distal end of the unitary outer race wherein the inner diameter of the cylindrical bore exceeds the outer diameter of the unitary outer race, the inner diameter of the counterbore and the inner diameter of the opening of the plate, and wherein the counterbore and the plate limit axial movement of the unitary outer race of the bearing cartridge.

* * * * *